United States Patent [19]

Baniel et al.

[11] 4,439,408

[45] Mar. 27, 1984

[54] PROCESS AND EXTRACTANT FOR REMOVING FLUORINE COMPOUNDS FROM AQUEOUS PHOSPHORIC ACID

[75] Inventors: Avraham M. Baniel, Jerusalem; Aharon M. Eyal, Kibbutz Ramat Rachel, both of Israel

[73] Assignee: Yissum Research Development Company of the Hebrew University of Jerusalem, Jerusalem, Israel

[21] Appl. No.: 384,008

[22] Filed: Jun. 1, 1982

[30] Foreign Application Priority Data

Jun. 15, 1981 [IL] Israel ................................ 63097

[51] Int. Cl.$^3$ .......................... C01B 25/16; C01B 7/00
[52] U.S. Cl. .............................. 423/321 S; 423/321 R; 423/462; 423/501
[58] Field of Search ............... 423/321 S, 321 R, 320, 423/167, 501, 462

[56] References Cited

U.S. PATENT DOCUMENTS

| | | | |
|---|---|---|---|
| 3,367,749 | 2/1968 | Koerner et al. | 423/321 S |
| 3,458,282 | 7/1969 | Koerner et al. | 423/321 S |
| 3,972,982 | 8/1976 | Centofanti | 423/321 S |
| 4,024,225 | 5/1977 | Chiang | 423/321 S |
| 4,053,564 | 10/1977 | Bradford et al. | 423/321 S |
| 4,291,007 | 9/1981 | Baniel | 423/321 S |

FOREIGN PATENT DOCUMENTS 691146 10/1979 U.S.S.R. .......................... 423/321 S

Primary Examiner—Gregory A. Heller
Attorney, Agent, or Firm—Murray Schaffer

[57] ABSTRACT

The invention provides a process for removing fluorine compounds from aqueuos phosphoric acid containing the same, which process comprises contacting the phosphoric acid with a water insoluble extractant comprising phosphoric acid and an oil soluble amine, the amine being substantially water insoluble both in free and in salt form and the extractant being substantially free of fluorine, sulfate and metal impurities. The invention also provides an extractant for use in the above process comprising an oil soluble amine, which amine is substantially water insoluble both in free and in salt form and a phosphoric acid.

9 Claims, No Drawings

PROCESS AND EXTRACTANT FOR REMOVING FLUORINE COMPOUNDS FROM AQUEOUS PHOSPHORIC ACID

The present invention relates to a process and extractant for removing fluorine compounds from aqueous phosphoric acid containing the same. More particularly the present invention relates to a process for removing fluorine compounds from phosphoric acid using an amine extractant.

As is known, phosphoric acid is manufactured primarily by the acidulation of "phosphate rock" with sulfuric acid. The phosphatic minerals in commercially important rocks are fluoroapatites i.e. minerals that approximate more or less closely the formula $Ca_{10}(PO_4)_6F_2$. The basic reaction of acidulation can be represented by the formula $Ca_{10}(PO_4)_6F_2 + 10H_2SO_4 = 10CaSO_4 + 6H_3PO_4 + 2HF$. Thus the formation of fluoride compounds (HF and its reaction products) is fundamental to and inseparable from the manufacture of phosphoric acid.

The product initially obtained from acidulation of phosphate rock—named "filter acid"—generally contains around 40% $PO_4$ (26%–30% $P_2O_5$) and around 2.5% F. The fluorine compounds are fluorides and fluoroslicates that are known to participate in complex equilibria in which the two acids HF and $H_2SiF_6$ intervene. For simplicity it is customary to use expressions such as "F-content" "fluoride volatilisation" "F-extraction" to refer to the whole range of F-compounds in wet process acid and in particular to the two acids HF and $H_2SiF_6$ whenever such usage provides for sufficient precision and the term fluoride compounds is used herein in this context.

As is further known phosphate rock contains, in addition to the calcium of fluoropatite, numerous metallic elements such as iron, aluminum and magnesium which are inevitably leached to some extent in the production of phosphoric acid. Thus filter acid always contains significant amounts of these elements which greatly affect many properties of the acid as discussed in greater detail hereinafter.

The bulk of the filter acid is concentrated by evaporation to obtain a 50/54% $P_2O_5$ acid which is the usual form for shipping and for conversion into fertilizers and other products. During this concentration about ⅔ of the F-content of the filter acid accompanies the water which is evaporated. This inevitable aspect of filter acid concentration imposes onerous burdens on phosphoric acid manufacture. For example, silicon tetrafluoride ($SiF_4$) is a major constituent of F-containing volatiles. It tends to hydrolyse with the deposition of silica. This renders the use of surface condensers impractical and dictates the use of direct contact condensation.

One result of this situation is that multiple stage evaporation is not applicable since the vapors cannot be used to supply heat to another stage.

Another result is that large volumes of dilute HF—$H_2SiF_6$ are obtained that present grave environmental problems.

Furthermore even concentrated 50/54% $P_2O_5$ acid still contains about 1% F. This F-content imposes limitations in certain uses and may require further processing for others. Thus, e.g., when the acid is neutralised with ammonia to make ammonium phosphates, the water contained in the acid is evaporated by the heat of reaction. The issuing steam contains F that may make it environmentally inacceptable.

For feed phosphates, fluoride content expressed as P to F weight ratio should be at least 100:1 (i.e. less than 1F to 222$P_2O_5$.) Further defluorination of 54% acid to this level requires energy-consuming steam stripping or a reagents consuming chemical treatment.

From the foregoing it is evident that defluorination of filter acid could provide for many advantages especially if F content were reduced to levels compatible with feed requirements and the present invention provides for such a defluorination by means of solvent extraction with a solvent which contains an amine as an active, acid-binding constituent.

The extraction of acids by amines is a well known art. The preferred extraction of HF and $H_2SiF_6$ with respect to $H_3PO_4$ is also known in the art and forms the subject matter of several patents. The defluorination however of filter acid by amines proves to be impractical since selectivity decreases sharply as defluorination progresses. Differently put, filter acid does not behave as a solution of $H_3PO_4$ containing HF and/or $H_2SiF_6$ which is not surprising in view of the complex composition of filter acids.

In U.S. Pat. No. 3,367,749 assigned to Monsanto there is described a process for purifying phosphoric acid. While this process may well be effective for phosphoric acids that contained impurities (especially metals) in the ranges stated in said patent, it is definitely impractical for phosphoric acids as they are these days. The fact is that since the middle 60's when the patent was filed there has been a continuous decrease in the quality of phosphate rock used in phosphoric acid manufacture with a concomitant and inevitable increase in impurity levels in phosphoric acids produced. This decrease in quality goes on as higher quality deposits are being exhausted and the mining of lower grade deposits is expanded.

Thus as opposed to the content of components in the phosphoric acid and referred to as feed in said U.S. Patent, analysis of typical Florida acid, processed today, is presented in the comparative table below.

| Constituent | $H_3PO_4$ | $SO_4$ | F | Fe | Al | Ca |
|---|---|---|---|---|---|---|
| Feed Acid per Monsanto Patent | 40.08 | 3.86 | 1.40 | 0.77 | 0.131 | 0.001 |
| Typical Florida filter acid | 36.30 | 1.51 | 2.33 | 0.88 | 0.560 | 0.190 |

As will be noted the presence of interferring metal impurities, in particular aluminum, has greatly increased over the years.

In fact already in 1975 Monsanto filed an additional application which issued as U.S. Pat. No. 3,972,982 and which proposes the extraction of fluorine compounds from aqueous phosphoric acid by extraction with a mixture of a silane and a long-chain hydrocarbyl amine.

The silanes described are not common commercial products and are obviously inherently expensive.

The inventors state in Column 1, lines 64–68 that "the process is most desirably employed to treat wet-process phosphoric acid which has been previously treated . . . to remove a major portion of the organic and inorganic impurities contained therin". As will be realized not only is the use of silane, but also the removal of a "major portion of the . . . inorganic impurities" is a very costly operation and presents furthermore no interest for bulk, major outlets of phosphoric acid, fertilizers and feed additives in particular.

Thus, despite wide-felt need for fluorine-free phosphoric acid, because of the reduced quality of phosphate rock sources, prior art amine extraction processes were capable of extracting only about 70% of fluorine and therefor in practice today there is no publicized commercial operation for extracting fluorine from phosphoric acid which is based on amine extraction.

It is to be noted that for most uses of phosphoric acid, e.g., in fertilizer and animal feeds the abovementioned metal impurities can be left in and therefore if they did not so interfere with fluorine removal from phosphoric acid, which removal is required for said uses, then there would be no need to invest in the removal of said metal impurities.

With the above need and state of the art in mind there has now been discovered an effective and commercially feasible and desirable method for extracting fluorine compounds from aqueous phosphoric acid containing the same, despite the relatively high levels of metal impurities found therein, using standard known amines in a novel extractant medium.

More specifically it has now been surprisingly discovered that when the prior art, known, oil-soluble amines are combined with a phosphoric acid, which phosphoric acid is substantially free of fluorine and sulfate impurities, there is produced a novel, effective extractant which successfully extracts fluorine compounds from aqueous phosphoric acid containing the same.

This is especially surprising since while it is known and also shown in comparative examples 1A and 1B that it is the presence of the metal impurities which interfere with the successful application of amine extractants to the extraction of fluorine compounds from phosphoric acid, the present process does not change the ratio of fluorine to metal impurities and does not attempt, and in fact eliminates the need for, prior removal of said metal impurities.

The presence of phosphoric acid in the extractant of the present invention confers on it the unique property of overcoming the interference of metal impurities with the preferential extraction of F with respect to phosphoric acid. Other acids (e.g. $H_2SO_4$) that might be considered admissible in phosphoric acid defluorination do not confer similar properties. Thus an amine extractant comprising $H_2SO_4$ does not constitute an extractant valid for the purposes of this invention.

In accordance with this discovery the present invention provides a process for removing fluorine compounds from aqueous phosphoric acid containing the same, said process comprising contacting said phosphoric acid with a water insoluble extractant comprising phosphoric acid and an oil soluble amine, said amine being substantially water insoluble both in free and in salt form and said extractant being substantially free of fluorine, sulfate and metal impurities.

In a preferred embodiment of the present invention the phosphoric acid in said extractant is obtained by combining an amine solvent with concentrated defluorinated and desulfated phosphoric acid to produce an extractant phase comprising said oil soluble amine and said phosphoric acid and being substantially fluorine, sulfate and metal impurity free.

An expanded process according to the invention comprises a. contacting said phosphoric acid to be purified with a water insoluble extractant comprising phosphoric acid and an oil soluble amine, said amine being substantially water insoluble both in free and in salt form and said extractant being substantially free of fluorine sulfate and metal impurities so that said fluorine compounds are transferred to said extractant phase;

b. separating said two phases;

c. concentrating said defluorinated phosphoric acid; and d. contacting an oil soluble amine as defined hereinafter with said concentrated defluorinated and desulfated phosphoric acid whereby there is produced an extractant loaded with said phosphoric acid and utilizeable as the extractant in the process of the present invention.

Especially preferred is such a process involving back-washing the fluorine loaded extractant phase separated from step b to remove fluorine, phosphoric and sulfuric acid therefrom, whereby there is formed an aqueous phase containing said fluorine compounds and sulfuric and phosphoric acids in acid or salt form and there remains an oil phase containing said oil soluble amine, and then reconstituting said extractant by contacting said remaining amine-containing oil phase with said concentrated defluorinated and desulfated phosphoric acid according to step d.

As indicated the oil soluble amines utilizeable in the present invention and included in said term are those amines which are substantially water insoluble both in free and in salt form, including those amines mentioned in said U.S. Pat. Nos. 3,367,749 and 3,972,982 as well as those mentioned in EP publication No. 0,017,500, corresponding to U.S. Pat. No. 4,291,007, the relevant teachings of which patents and publications are incorporated herein by reference.

Thus, a very wide range of amines by themselves or with known prior art diluents can be used in the practice of the invention. Generally any amine solvent capable of extracting phosphoric acid can be used to defluorinate wet process acid according to this invention.

Obviously not only those amines as described in the above mentioned publications but solutions thereof in hydrocarbons which may be further modified by water-insoluble polar derivatives such as alcohols, ketones etc. and combinations thereof are suitable in the practice of this invention. The selection can be made quite easily by selecting amine and diluent by considerations of price, availability, stability and other considerations obvious to any engineer experienced in solvent extraction.

The amount of the amine solvent is easily adjusted to carry in the extract the $H_2SO_4$, fluorine and the minimum of phosphoric acid to accompany them. This amount can be simply derived from a few equilibration tests with the acid to be defluorinated and the solvent to be used. However, in some cases it may be found more expedient to use an amine in excess over defluorination requirements, whereby the number of extraction stages can be reduced. This is particularly the case if extracted phosphoric acid virtually free of metallic impurities is required, e.g., for liquid fertilizers obtained by solvent regeneration with ammonia.

The present invention also provides a novel extractant for use in removing fluorine compounds from aqueous phosphoric acid containing the same, said extractant comprising phosphoric acid and an oil soluble amine, said amine being substantially water insoluble both in free and in salt form and said extractant being substantially free of fluorine, sulfate and metal impurities.

The term phosphoric acid as used herein to designate and describe one of the two principal components of the extractant of the present invention is intended to indicate the source of said component and its character upon entry and exit from said extractant, however it will be realized that in said extractant said phosphoric acid may assume several other forms, including ionic and amine salt form, and said forms are all intended to be included by said term.

In an especially preferred embodiment of the present invention said extractant further comprises a strong organic acid which acid is oil soluble and substantially water insoluble both in free and in salt form. Preferably said strong organic acid is an aliphatic sulfonic acid, an aromatic sulfonic acid or an alpha-, beta- or gamma (mono-, or poly-) chloro or bromo substituted carboxylic acid, of the type described in EP No. 0017,500 and the relevant teachings of said publication with regard to the organic acid component and its function are also incorporated herein by reference.

While, as indicated, many various known amines as well as mixtures of such amines can be used in the present invention especially preferred are primary aliphatic amines in which the nitrogen is directly bonded to a tertiary carbon atom or trilaurylamine (TLA) tridecylamine (TDA) or tricaprylylamine (TCA) which types of amines are readily commercially available and therefor readily and inexpensively obtained.

Preferably the extractant will comprise between about 0.25 and 5 moles of phosphoric acid for each mole of amine therein and especially preferred are extractants which comprise between 1 to about 4 moles of phosphoric acid for each mole of amine therein.

When said extractant also contains an organic acid as described hereinbefore then preferably the molar ratio of said organic acid to said amine will be between about 0.5:2 and 2:0.5 and especially preferred is a ratio of between about 0.5 to 1 and 1 to 0.5.

In addition to achieving a comprehensive defluoridation the practice of the present invention provides for many advantages including:

1. Energy savings. After defluorination, filter acid can be concentrated in multiple effect evaporators thereby decreasing steam requirements by 50% or more.

2. Desulfation. Wet process acid generally contains free sulfuric acid: 1% to 3% being typical of filter acid. Though this acid has value in certain applications due to its acidic hydrogens (e.g. binding ammonia in fertilizer ammonium phosphates) is redundant and even harmful in other applications (e.g. in feed phosphates). Furthermore, the manufacturer of phosphoric acid and phosphates cannot charge for the sulfur contained in it which thus represents a net loss.

In the practice of this invention, the filter acid is virtually completely desulfated.

The sulfate values thus removed can be recovered in a useful form from the solvent (e.g. ammonium sulfate) or used in pre-treating phosphate rock to decrease subsequent acid consumption. Furthermore, the desulfated acid can be concentrated to 56%–60% $P_2O_5$ under the same conditions in which 52%–54% $P_2O_5$ were obtained from nondesulfated acid.

3. Regulation of extraction temperature. As is well known temperature control provides for process optimisation. In the present invention temperature control is easily and efficiently achieved. Thus, e.g., the temperature of the regenerated solvent is easily adjustable by direct contact with water having the appropriate temperature or with the acid solution contacted with it for the purposes of reconstitution of the extractant.

This easy heat transfer is possible due to the virtual insolubility of the solvent in water.

The temperature of the concentrated acid can be regulated by the degree of cooling applied to it after evaporation.

Thus the temperature in extraction is easily established by adjusting solvent temperature and/or acid temperature and in this manner preferred extraction temperatures of between about 50° C. and 70° C. and especially preferred between 55° C. and 65° C. are readily obtained.

After the extraction has taken place and the fluorine compounds are transferred to the extractant phase, the amine solvent can be regenerated and the extractant reconstituted for recycling in a relatively simple manner.

The solvent can be regenerated by known means of which reaction with alkalis is most common. NaOH, KOH or ammonia may be used singly or in combination to regenerate the amine and obtain the extracted phosphoric and sulfuric acid as alkali phosphate and sulfate in solution and the extracted fluoride as sparingly soluble $Na_2SiF_6$ or $K_2SiF_6$ or as soluble NaF and KF. All these reactions are well known and need not be detailed with respect to this invention. The main point is that alkali treatment or another treatment known in the art completely regenerates the solvent.

As indicated hereinbefore, of particular interest is the use of an extractant wherein the amine is associated with an organic acid as described in EP publication No. 0017500.

Whereas the application of these organic acid containing extractants to defluorinate phosphoric acid does not materially differ from the application of amine extractants according to the invention which do not contain organic acid, when practicing the present invention it has the advantage that the solvent can be fully (or partially) regenerated by water without recourse to alkali. This obviously provides far greater freedom in products that can be made coincidentally to defluoridation. In particular it provides for the recovery of a significant part of the defluorinated acid in a state of very high purity.

Once the amine solvent has been regenerated, e.g., by backwashing with alkali in the absence of organic acid or by the backwashing with simple water in the presence of organic acid, then the extractant can be reconstituted by adding thereto phosphoric acid which is substantially free of fluorine and sulfate impurities which phosphoric acid can simply be purchased, can be obtained from a previous batch of any defluorinating process or which, preferably, as described, is obtained from the concentrated raffinate of the defluorination of phosphoric acid according to the present invention, since any phosphoric acid substantially free of fluorine and sulfate impurities and containing about 10% or more $P_2O_5$ is acceptable for preparing and/or reconstituting an extractant according to the present invention.

While the invention will now be described in connection with certain preferred embodiments in the following examples so that aspects thereof may be more fully understood and appreciated it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of the principles and conceptual aspects of the invention.

EXAMPLE 1

Extractants comprising phosphoric acid and an amine or amine mixture in xylene were used in countercurrent fluorine extraction from Florida Filter acid (see Table I) at 60° C. Results are summarized in Table II.

TABLE I

COMPOSITION OF FILTERED WET-PROCESS PHOSPHORIC ACIDS (FLORIDA ROCK SOURCE)

| $P_2O_5$ | F | $Fe_2O_3$ | $Al_2O_3$ | MgO | $K_2O$ | $Na_2O$ | CaO | $SO_4$ | Mn | V | Cr | Zn | Cd | Cu |
|---|---|---|---|---|---|---|---|---|---|---|---|---|---|---|
| 26.3% | 2.3% | 1.25% | 1.05% | 0.38% | .05% | 0.11% | 0.26% | 1.51% | 230 ppm | 180 ppm | 40 ppm | 35 ppm | <10 ppm | <10 ppm |

TABLE II

| Experiment number | the amine* | Total amine concentration mol/lit | $H_3PO_4$ to amine molar ratio | extractant to filter acid volume ratio | number of stages | P:F weight ratio in filter acid | in raffinate |
|---|---|---|---|---|---|---|---|
| 1 | TDA | 0.25 | 4 | 2 | 4 | 4.9 | 160 |
| 2 | TLA | 0.25 | 3 | 2 | 5 | 4.9 | 150 |
| 3 | TLA + TCA | 0.25 | 1 | 5 | 5 | 4.9 | 130 |
| 4 | TLA + TCA | 0.50 | 1 | 3 | 5 | 4.9 | 130 |

*TDA - tridecyl amine, TLA - trilauryl amine, TCA - tricaprylyl amine (all three sold by Henkel Corp. as Alamine 310, 304 and 336 respectively)
In exp. 3 and 4 TLA to TCA molar ratio was 1:1

TABLE III

| Experiment Number | $H_3PO_4$ to amine molar ratio in extractant | extractant to filter acid volume ratio | number of stages | P:F weight ratio in filter acid | P:F weight ratio in raffinate |
|---|---|---|---|---|---|
| 1 | 1.5:1 | 10 | 4 | 4.9 | 100 |
| 2 | 1.6:1 | 5 | 7 | 4.9 | 100 |
| 3 | 2.4:1 | 5 | 6 | 4.9 | 220 |

Phosphoric acid is extracted by water from the extractant phase obtained in experiment 1 (Table III). One half of the $H_3PO_4$ contained in the extractant phase (which is 10% of the $PO_4$ in the filter acid) is obtained as a 20% phosphoric acid solution substantially free of metal, sulfuric acid and fluorine.

COMPARATIVE EXAMPLE 1A 0.25 M trilaurylamine in xylene (not loaded with $H_3PO_4$) was used in five stage countercurrent fluorine extraction from pure phosphoric acid solution (40% $H_3PO_4$) to which 2.3%F (in the form of $H_2SiF_6$) was added. In an extractant to acid volume ratio of 1:1 and at 60° C. a P:F weight ratio above 200 was obtained.

COMPARATIVE EXAMPLE 1B 0.25 M trilaurylamine in xylene (not loaded with $H_3PO_4$) was used in five stage countercurrent fluorine extraction from Florida filter acid. In extractant to filter acid volume ratio of 2:1 and at 60° C. a raffinate with P:F weight ratio of 25 is obtained. This raffinate went through another five stage countercurrent extraction with the same extractant to acid ratio, which resulted in no considerable change in P:F ratio.

Repeating this experiment with higher extractant to filter acid volume ratio resulted in even lower P:F ratios due to extraction of more $H_3PO_4$ with the F. It is thus evident that the poor extractibility of F in common filter acids cannot be overcome by an increased ratio of the extracting amine.

EXAMPLE 2

An extractant containing 0.25 M trilaurylamine and 0.25 M α-bromolauric acid (produced by Miles-Yeda, Rehovot, Israel) loaded with $H_3PO_4$ was used in countercurrent fluorine extraction from Florida filter acid at 60° C. Results are summarized in Table III.

EXAMPLE 3

An extractant comprising 0.75 M $H_3PO_4$, 0.125 M TLA and 0.125 M TCA in xylene, was contacted in five countercurrent stages with Florida filter acid wherein the extractant to acid volume ratio was 2:1 and the temperature of extraction was maintained at 60° C. The phases were then separated. 100 ml of the aqueous phase were concentrated to give an acid containing 56% $P_2O_5$, 0.20%F and 0.09% $H_2SO_4$. 200 ml of the oil phase were agitated with 500 ml of concentrated $(NH_4)_2SO_4$ solution. Concentrated ammonia was added to adjust the pH in the aqueous phase to 2.8. The phases were then separated.

The oil phase was contacted with the concentrated defluorinated phosphoric acid. The phases were then separated and analysed: The oil phase contained 0.25 M amines, 0.75 M $H_3PO_4$ and less than 0.001 M $H_2SO_4$ and metals. The aqueous phase contained 47% $P_2O_5$ and P:F weight ratio of 102.

EXAMPLE 4

An extractant comprising 0.42 M $H_3PO_4$, 0.25 M TLA and 0.25 M α-Bromolauric acid in kerosine was contacted in six counter current stages with Florida filter acid with an extractant to acid volume ratio of 6:1 and a temperature of extraction of 60° C. The phases were then separated.

100 ml of the aqueous phase were concentrated to give an acid containing 56% $P_2O_5$, 0.20%F and 0.05% $H_2SO_4$.

600 ml of the oil phase were contacted with 15 ml water. After phase separation the aqueous phase contained 22% $H_3PO_4$, 0.18%F and less than 0.01% $H_2SO_4$ and metals.

The oil phase was then agitated with 1500 ml of concentrated $(NH_4)_2SO_4$ solution. Concentrated ammonia was added to adjust the pH in the aqueous phase to 2.8. The phases were then separated.

The oil phase was contacted with the concentrated desulfated, defluorinated phosphoric acid. The phases were then separated and analysed: The oil phase contained 0.42 M $H_3PO_4$, less than 0.001 $H_2SO_4$ and metals, 0.25 M TLA, and 0.25 M α-Bromolauric acid. The aqueous phase contained 42% $P_2O_5$ and P:F weight ratio of 89.

EXAMPLE 5

An extractant comprising 0.42 M $H_3PO_4$, 0.25 M TLA and 0.25 M α-Bromolauric acid in kerosine was contacted in six counter current stages with Florida filter acid with an extractant to acid volume ratio of 6:1 and a temperature of extraction of 60° C. The phases were then separated.

100 ml of the aqueous phase were concentrated to give an acid containing 56% $P_2O_5$, 0.20%F and 0.05% $H_2SO_4$.

400 ml of the oil phase were contacted for 15 min at 60° C. with aqueous solution composed of 310 gr $KH_2PO_4$, 1150 gr of 85% $H_3PO_4$ solution and 750 gr of water. About 2 gr of $K_2SiF_6$ precipitated and settled to the bottom of the aqueous phase which aqueous phase was recycled for use as described hereinafter in Example 6. After phase separation the oil phase was contacted with 10 ml water and the resulting separated aqueous phase contained 22% $H_3PO_4$ and less than 0.01% each of $H_2SiF_6$, $H_2SO_4$ and metals.

The oil phase was then agitated with 1500 ml of concentrated $(NH_4)_2SO_4$ solution. Concentrated ammonia was added to adjust the pH in the aqueous phase to 2.8. The phases were then separated.

The oil phase was contacted with the concentrated desulfated, defluorinated phosphoric acid. The phases were then separated and analysed: the oil phase contained 0.42 M $H_3PO_4$, less than 0.001 $H_2SO_4$ and metals, 0.25 M TLA, and 0.25 M α-Bromolauric acid. The aqueous phase contained 42% $P_2O_5$ and P:F weight ratio of 89.

EXAMPLE 6

An extractant comprising 0.42 M $H_3PO_4$, 0.25 M TLA and 0.25 M α-Bromolauric acid in kerosine was contacted in six counter current stages with Florida filter acid with an extractant to acid volume ratio of 6:1 and a temperature of extraction of 60° C. The phases were then separated.

100 ml of the aqueous phase were concentrated to give an acid containing 56% $P_2O_5$, 0.20%F and 0.05% $H_2SO_4$.

400 ml of the oil phase were contacted for 15 min at 60° C. with the potassium containing aqueous phase recycled for use from the process as described in Example 5 and 1 gr KOH was added thereto. About 2 gr of $K_2SiF_6$ precipitated and settled to the bottom of the aqueous phase, which aqueous phase was recycled for further use with addition of KOH. after phase separation the oil phase was contacted with 10 ml water and the resulting separated aqueous phase contained 22% $H_3PO_4$ and less than 0.01% each of $H_2SiF_6$, $H_2SO_4$ and metals.

The oil phase was then agitated with 1500 ml of concentrated $(NH_4)_2SO_4$ solution. Concentrated ammonia was added to adjust the pH in the aqueous phase to 2.8. The phases were then separated.

The oil phase was contacted with the concentrated desulfated, defluorinated phosphoric acid. The phases were then separated and analysed: the oil phase contained 0.42 M $H_3PO_4$, less than 0.001 $H_2SO_4$ and metals, 0.25 M TLA, and 0.25 M α-Bromolauric acid. The aqueous phase contained 42% $P_2O_5$ and P:F weight ratio of 89.

It will be evident to those skilled in the art that the invention is not limited to the details of the foregoing illustrative embodiments and examples and that the present invention may be embodied in other specific forms without departing from the essential attributes thereof, and it is therefore desired that the present examples be considered in all respects as illustrative and not restrictive, reference being made to the appended claims, rather than to the foregoing description, and all changes which come with the meaning and range of equivalency of the claims are, therefore, intended to be embraced therein.

What is claimed is:

1. A process for selectively extracting fluorine compounds from aqueous phosphoric acid containing the same, said process comprising contacting said phosphoric acid with an extractant comprising phosphoric acid and an oil soluble amine, said phosphoric acid being present in said extractant in an amount of at least 0.25 moles for each mole of amine therein, said amine being substantially water insoluble both in free and in salt form and said extractant being substantially free of fluorine, sulfate and metal impurities.

2. A process according to claim 1, wherein said phosphoric acid in said extractant does not exceed 5 moles for each mole of amine therein.

3. A process according to claim 1, wherein said extractant comprises between about 1 to about 4 moles of phosphoric acid for each mole of amine therein.

4. A process according to claim 1 wherein said extractant further comprises a strong organic acid which acid is oil soluble and substantially water insoluble both in free and in salt form.

5. A process according to claim 4 wherein the molar ratio of said organic acid to said amine is between about 0.5:2 and 2:.0.5.

6. A process according to claim 4 wherein said strong organic acid is an aliphatic sulfonic acid, an aromatic sulfonic acid or an alpha-, beta- or gamma-chloro or bromo substituted carboxylic acid.

7. A process according to claim 1 wherein the phosphoric acid in said extractant is obtained by combining an amine solvent with concentrated defluorinated and desulfated phosphoric acid to produce an extractant phase comprising said oil soluble amine and said phosphoric acid and being substantially fluorine and sulfate impurity free.

8. A process according to claim 1 for selectively extracting fluorine compounds from aqueous phosphoric acid containing the same, said process comprising:

a. contacting said phosphoric acid with an extractant comprising phosphoric acid and an oil soluble amine, said phosphoric acid being present in said extractant in an amount of at least 0.25 moles for each mole of amine therein, said amine being substantially water insoluble both in free and in salt form and said extractant being substantially free of fluorine sulfate and metal impurities, so that said fluorine compounds are transferred to said extractant phase;

b. separating said two phases;

c. concentrating said defluorinated phosphoric acid; and d. contacting an oil soluble amine as defined with said concentrated defluorinated phosphoric acid whereby there is produced an extractant loaded with said defluorinated phosphoric acid utilizable as said extractant of paragraph (a).

9. A process according to claim 8 comprising backwashing the fluorine loaded extractant phase separated from step (b) to remove fluorine, phosphoric and sulfuric acid therefrom, whereby there is formed an aqueous phase containing said fluorine compounds and sulfuric and phosphoric acid in acid or salt form and there remains an oil phase containing said oil soluble amine, and then reconstituting said extractant by contacting said remaining amine-containing oil phase with said concentrated, desulfated, defluorinated, phosphoric acid according to step (d).

* * * * *